A. H. GRUNTLER.
REVERSIBLE CLUTCH.
APPLICATION FILED MAR. 2, 1918.
1,275,905.
Patented Aug. 13, 1918.
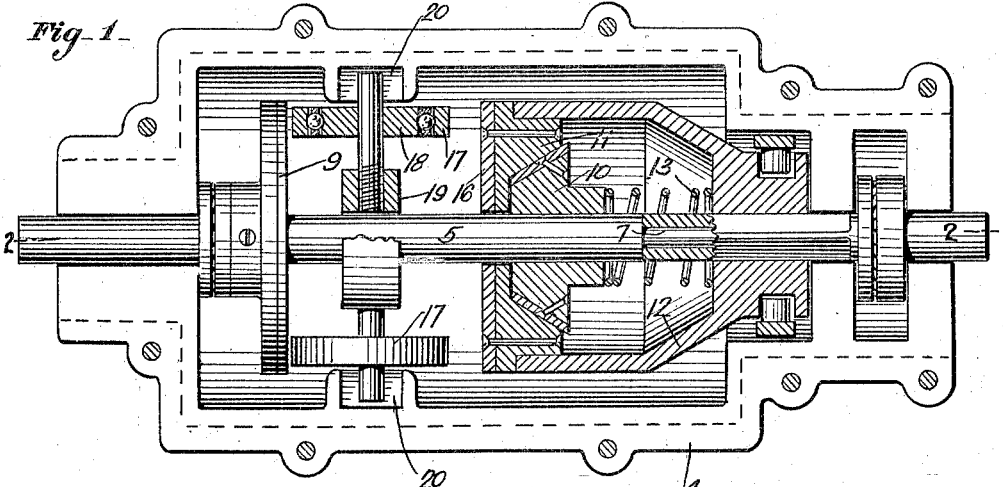
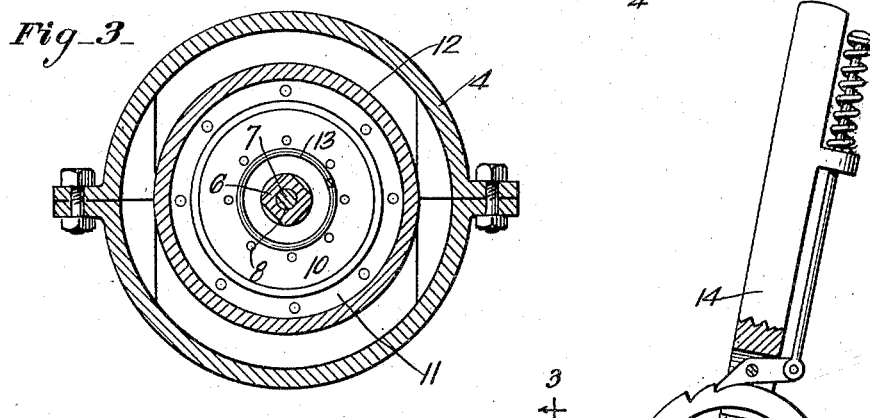
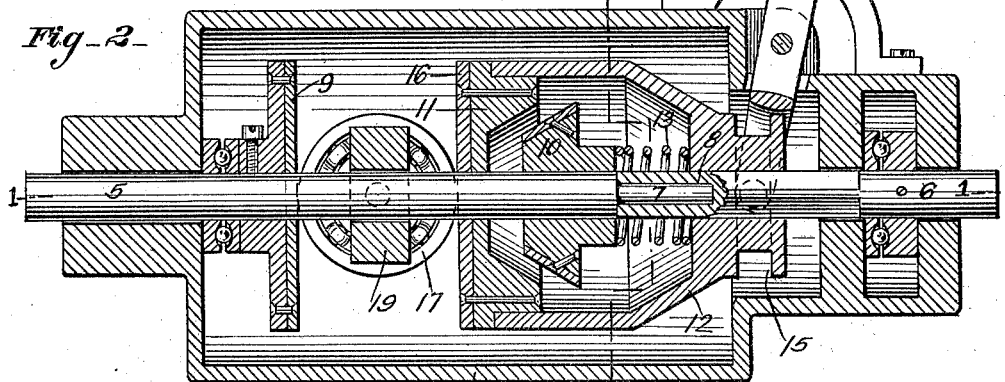

UNITED STATES PATENT OFFICE.

ADAM HENRY GRUNTLER, OF HARTFORD, CONNECTICUT.

REVERSIBLE CLUTCH.

1,275,905.  Specification of Letters Patent.  Patented Aug. 13, 1918.

Application filed March 2, 1918. Serial No. 220,079.

*To all whom it may concern:*

Be it known that I, ADAM HENRY GRUNTLER, a citizen of the United States, residing at Hartford, in the county of Hartford and State of Connecticut, have invented a new and Improved Reversible Clutch, of which the following is a full, clear, and exact description.

My invention relates to a reversible clutch of the frictional type. An object of the invention is to provide a simple, inexpensive and efficient clutch.

I attain the above and other objects of my invention by the structure conventionally disclosed in the accompanying drawings, wherein similar characters of reference indicate corresponding parts in all the views.

Figure 1 is a vertical section on line 1—1, Fig. 2, certain parts being shown in elevation to better illustrate the invention;

Fig. 2 is a longitudinal section on line 2—2, Fig. 1; and

Fig. 3 is a transverse section on line 3—3, Fig. 2.

Referring to the drawings, 4 is the housing of the clutch in which the driving and driven shafts 5 and 6 are mounted to rotate. The driving shaft 5 has, preferably, a reduced end portion 7 bearing in a socket 8, provided in the driven shaft 6. The driving shaft carries a friction disk 9 constrained to revolve with the shaft. The driving shaft also carries a cone clutch member 10 constrained to revolve with the shaft.

The complementary cone clutch member 11 of the member 10 is mounted to revolve on the driven shaft 5 and is located between the friction disk 9 and the said cone clutch member 10. The cone clutch member 11 has an extension 12 which connects said member to the driven shaft 6 so that the clutch member 11 is constrained to revolve with the driven shaft but is free to slide, so that the clutch member 11 may be moved in and out of engagement with the clutch member 10.

A spring 13 is interposed between the extension 12 and the clutch member 10 which normally tends to bring the clutch members 10 and 11 into engagement. The sliding movement of the clutch member 11 is controlled by a lever 14 which has a fork engaging a suitable groove 15 in the extension 12.

The clutch member 11 carries a friction disk or surface 16 which faces the friction disk 9 and which is of substantially the same diameter as the friction disk 9. Interposed between the friction disks 9 and 16 are friction rollers 17 revolubly mounted on carriers 18. The carriers have trunnions supported in a ring 19 in which the driving shaft 5 bears, and also supported in bearings 20 provided in the housing 4, said bearings 20 permitting the trunnions to slide, whereby when the clutch member 11 is disengaged from the clutch member 10 by the lever 14 the friction disk 16 can be brought against the friction rollers 17 and, therefore, move against the friction disk 9. This engagement of the friction rollers with the friction disks will reverse the direction of rotation of the shaft 6 as compared with the direction of rotation caused by the engagement of the clutch members 10 and 11.

I claim:

1. A reversible clutch comprising a driving member, a driven member, a friction disk constrained to revolve with the driving member, a friction cone constrained to revolve with the driving member, a second friction cone revolubly mounted between the friction disk and the friction cone and adapted to engage the friction cone on the driving member, said friction cone being constrained to revolve with the driven member but free to slide thereon, a friction disk moving with said second friction cone, friction rollers interposed between the friction disk on the driving member and the disk on the second friction cone, and means for sliding said second friction cone on the driven shaft whereby it may be brought into engagement with the friction cone on the driving member or the friction disk on said second cone brought into engagement with the friction disk on the driving member.

2. A reversible clutch comprising a driving member, a driven member, friction cones for coupling said driving and driven members, a friction disk constrained to revolve with the driving member, a friction disk separated from and moving with the friction cone of the driven member, friction rollers interposed between the friction disks, and means for controlling the friction cones adapted to control the friction disks substantially as and for the purpose set forth.

3. A reversible clutch comprising a driving member, a driven member, a friction disk constrained to revolve with the driving member, a friction cone constrained to revolve with the driving member, a second friction cone constrained to revolve with the driven member between the friction disk and the friction cone, a friction disk movable with the second friction cone, friction rollers, a support for said friction rollers mounted to float on the driving member, and means for moving said second friction cone whereby the same can be thrown into engagement with the friction cone on the driving member, or the disk on said second friction cone can be brought into engagement with the friction rollers and, therefore, with the friction disk on the driving member.

ADAM HENRY GRUNTLER.

Witness:
ABRAHAM A. KATZ.